United States Patent
Steinhilb (10) Patent No.: US 11,945,364 B2
(45) Date of Patent: Apr. 2, 2024

(54) AUTOMOTIVE HEADLIGHT ATTACHMENT LOADING BLOCK FOR PEDESTRIAN PROTECTION

(71) Applicant: TOYOTA MOTOR ENGINEERING & MANUFACTURING NORTH AMERICA, INC., Plano, TX (US)

(72) Inventor: Aaron R. Steinhilb, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 114 days.

(21) Appl. No.: 17/495,526

(22) Filed: Oct. 6, 2021

(65) Prior Publication Data
US 2023/0106355 A1   Apr. 6, 2023

(51) Int. Cl.
*B60Q 1/04*   (2006.01)

(52) U.S. Cl.
CPC ......... *B60Q 1/0491* (2013.01); *B60Q 1/0483* (2013.01)

(58) Field of Classification Search
CPC ............................ B60Q 1/0491; B60Q 1/0483
See application file for complete search history.

(56) References Cited

U.S. PATENT DOCUMENTS

| | | | |
|---|---|---|---|
| 4,359,120 A | 11/1982 | Schmidt et al. | |
| 6,547,316 B2 | 4/2003 | Chung | |
| 7,832,793 B2 | 11/2010 | Garnweidner | |
| 7,849,559 B2 | 12/2010 | Lindmark et al. | |
| 9,630,581 B2 * | 4/2017 | Hammer | G01B 21/02 |
| 2002/0060474 A1 * | 5/2002 | Chung | B60R 21/34 296/29 |
| 2002/0171262 A1 * | 11/2002 | Ozawa | B60R 21/34 296/203.02 |
| 2004/0251716 A1 * | 12/2004 | Choi | B60R 21/34 296/187.03 |
| 2006/0250899 A1 * | 11/2006 | Clapie | B62D 25/084 369/1 |
| 2007/0029840 A1 | 2/2007 | Marijnissen et al. | |

FOREIGN PATENT DOCUMENTS

| | | |
|---|---|---|
| CN | 112046388 A | 12/2020 |
| JP | H06336179 A | 12/1994 |

* cited by examiner

*Primary Examiner* — Julie A Bannan
(74) *Attorney, Agent, or Firm* — HAYNES AND BOONE, LLP (57) ABSTRACT

A vehicle is provided that includes a hood outer panel, hood inner panel, and engine compartment. A fender attachment bracket is disposed within the engine compartment, and a headlight assembly includes an attachment portion that couples the headlight assembly to the fender attachment bracket. The headlight assembly also includes a load block or loading block sized and shaped so that when the hood outer panel and hood inner panel are deformed by the impact of an object, the hood inner panel contacts the load block.

16 Claims, 12 Drawing Sheets

AUTOMOTIVE HEADLIGHT ATTACHMENT LOADING BLOCK FOR PEDESTRIAN PROTECTION

TECHNICAL FIELD

The subject matter described herein relates to a device, system, and method for improving pedestrian safety during frontal vehicle-pedestrian impacts. This device, system, and method have particular but not exclusive utility for automobiles and trucks.

BACKGROUND

Many modern vehicles are designed with pedestrian safety in mind. Pedestrian safety is tested both physically (using actual dummy collisions staged under laboratory conditions) and virtually (using computer models and numerical analysis) to determine the forces, accelerations, and deformations that a pedestrian will experience in a given set of crash conditions for a given vehicle design. One particularly challenging scenario occurs during the frontal pedestrian impact mode called Global Technical Regulation 9 (GTR9), wherein a vehicle bumper strikes a small-stature pedestrian (e.g., a child) at a speed of 35 kilometers per hour (KPH). In such a crash, the pedestrian's head may strike the vehicle hood, potentially causing traumatic injury. To minimize any resulting head trauma, it is advantageous to minimize the acceleration experienced by the headform during the hood impact event. However, the impact load is distributed across multiple load paths within the vehicle's structure and components. Load paths involving a headlight assembly and fender attachment bracket typically occur late in the headform impact event, and thus have minimal effect on the total acceleration experienced by the headform.

Thus, currently used headlight assemblies have numerous drawbacks, including limited mitigation of GTR9-type pedestrian impacts, and otherwise. Accordingly, a need exists for improved headlight assemblies that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a headlight attachment loading block. In a GTR9-type frontal collision between a vehicle and a pedestrian, the pedestrian's headform makes contact with the vehicle's hood, deforming the hood and causing trauma to the headform. In such a collision event, the headlight attachment loading block provides earlier contact between the deforming hood and the headlight-to-front-fender attachment inside the engine compartment. This earlier contact changes the load paths of the headform impact, thus resulting in less total acceleration of the headform and therefore a lower Head Injury Criterion (HIC).

The headlight attachment loading block structure disclosed herein has particular, but not exclusive, utility for pedestrian collision mitigation in automobiles and trucks. One general aspect includes a vehicle which includes a hood outer panel; a hood inner panel, a fender attachment bracket disposed within an engine compartment of the vehicle, and a headlight assembly. The headlight assembly includes an attachment portion coupling the headlight assembly to the fender attachment bracket, and a load block configured such that when an impact of an object deforms the hood outer panel and hood inner panel, the hood inner panel contacts the load block.

Implementations may include one or more of the following features. In some embodiments, the load block is coupled to the attachment portion. In some embodiments, the load block includes a polymer. In some embodiments, the load block includes at least one of a stiffening spine or a plurality of fins. In some embodiments, a clearance gap between the load block and the hood inner panel includes a distance of 2-10 millimeters. In some embodiments, the load block is configured to minimize pooling of liquids. In some embodiments, the load block is configured to alter a timing or magnitude of a load force along load paths of the vehicle associated with the impact. In some embodiments, the load block is configured to shorten a time between the impact and a loading of at least one load path including the headlight assembly. In some embodiments, at least one load path of the at least one load path including the headlight assembly also includes the fender attachment bracket. In some embodiments, the object is a headform of a pedestrian, and the impact results from a collision of the vehicle with the pedestrian. In some embodiments, the load block is configured to reduce at least one of a peak acceleration, a total acceleration, or a head impact criterion (HIC) experienced by the object as a result of the impact.

One general aspect includes a method. The method includes, on a headlight assembly of a vehicle, providing an attachment portion coupling the headlight assembly to a fender attachment bracket of the vehicle, and a load block configured such that when an impact of an object deforms a hood outer panel and hood inner panel of the vehicle, the hood inner panel contacts the load block.

Implementations may include one or more of the following features. In some embodiments, the method where the load block is coupled to the attachment portion. In some embodiments, the load block includes a polymer and at least one of a stiffening spine or a plurality of fins. In some embodiments, the load block is configured to alter a timing or magnitude of a load force along load paths of the vehicle associated with the impact. In some embodiments, the load block is configured to shorten a time between the impact and a loading of at least one load path including the headlight assembly. In some embodiments, at least one load path of the at least one load path including the headlight assembly also includes the fender attachment bracket. In some embodiments, the object is a headform of a pedestrian, and the impact results from a collision of the vehicle with the pedestrian. In some embodiments, the load block is configured to reduce at least one of a peak acceleration, a total acceleration, or a head impact criterion (HIC) experienced by the object as a result of the impact. Implementations of the described techniques may include hardware, a method or process, or computer software on a computer-accessible medium.

One general aspect includes a system for distributing crash energy within a vehicle. The system includes the vehicle; a hood outer panel of the vehicle, a hood inner panel of the vehicle, a fender attachment bracket disposed within an engine compartment of the vehicle, and a headlight assembly of the vehicle including: an attachment portion coupling the headlight assembly to the fender attachment bracket; and a load block configured such that when an impact of a pedestrian headform deforms the hood outer panel and hood inner panel, the hood inner panel contacts the load block to shorten a time between the impact and a loading of at least one load path including the headlight assembly and the fender attachment bracket, and where the load block is configured to reduce at least one of a peak acceleration, a total acceleration, or a head impact criterion (HIC) experienced by the headform as a result of the impact. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the headlight attachment loading block, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

During a frontal pedestrian impact, the pedestrian headform collides with the vehicle hood. The hood loads the headlamp or headlight assembly, and initiates deformation of the fender attachment bracket. The authors of this application have found the timing of this loading has been to be important for reducing head injury. If the headlight assembly is loaded too late, there may not be not enough energy in the impact to initiate buckling of the fender attachment bracket.

In accordance with at least one embodiment of the present disclosure, a headlight attachment loading block structure is disclosed that provides reduced pedestrian headform acceleration in GTR9-type pedestrian collision events. Current designs of the headlight-to-front-fender attachment do not have any features specifically designed to reduce pedestrian injury in a frontal collision. With a standard design, the force of a pedestrian headform impact on the vehicle hood is distributed along different load paths at different times, as the hood deforms and comes into contact with different vehicle components (e.g., components within the engine compartment). The headlight-to-front-fender attachment may be made of frangible plastic or other lightweight breakable/crushable materials, and may therefore be capable of absorbing or dissipating some of the impact energy and/or passing impact energy to other frangible or deformable components such as the fender attachment bracket. However, due to the distribution of components within the vehicle, loading through the headlight-to-front-fender attachment may occur fairly late in the impact event. Thus, fracture or crumpling of the headlight-to-front-fender attachment and/or fender attachment bracket may occur too late to reduce traumatic injury to the pedestrian headform.

Disclosed is a headlight attachment loading block. In a GTR9-type frontal collision between a vehicle and a pedestrian, the pedestrian's headform makes contact with the vehicle's hood, deforming the hood and potentially causing traumatic injury to the headform. In such a collision event, the headlight attachment loading block can provide earlier contact between the deforming hood and the headlight-to-front-fender attachment inside the engine compartment. This earlier contact changes the load paths of the headform impact, thus resulting in earlier loading of the headlight-to-front-fender attachment and allowing earlier fracture or crumpling of the headlight-to-front-fender attachment, fender attachment bracket, and associated components. This may consequently result in less total acceleration of the headform and therefore a lower Head Injury Criterion (HIC), with correspondingly lower risk of traumatic injury to the pedestrian.

These descriptions are provided for exemplary purposes only, and should not be considered to limit the scope of the headlight attachment loading block. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figures 1A, 1B:
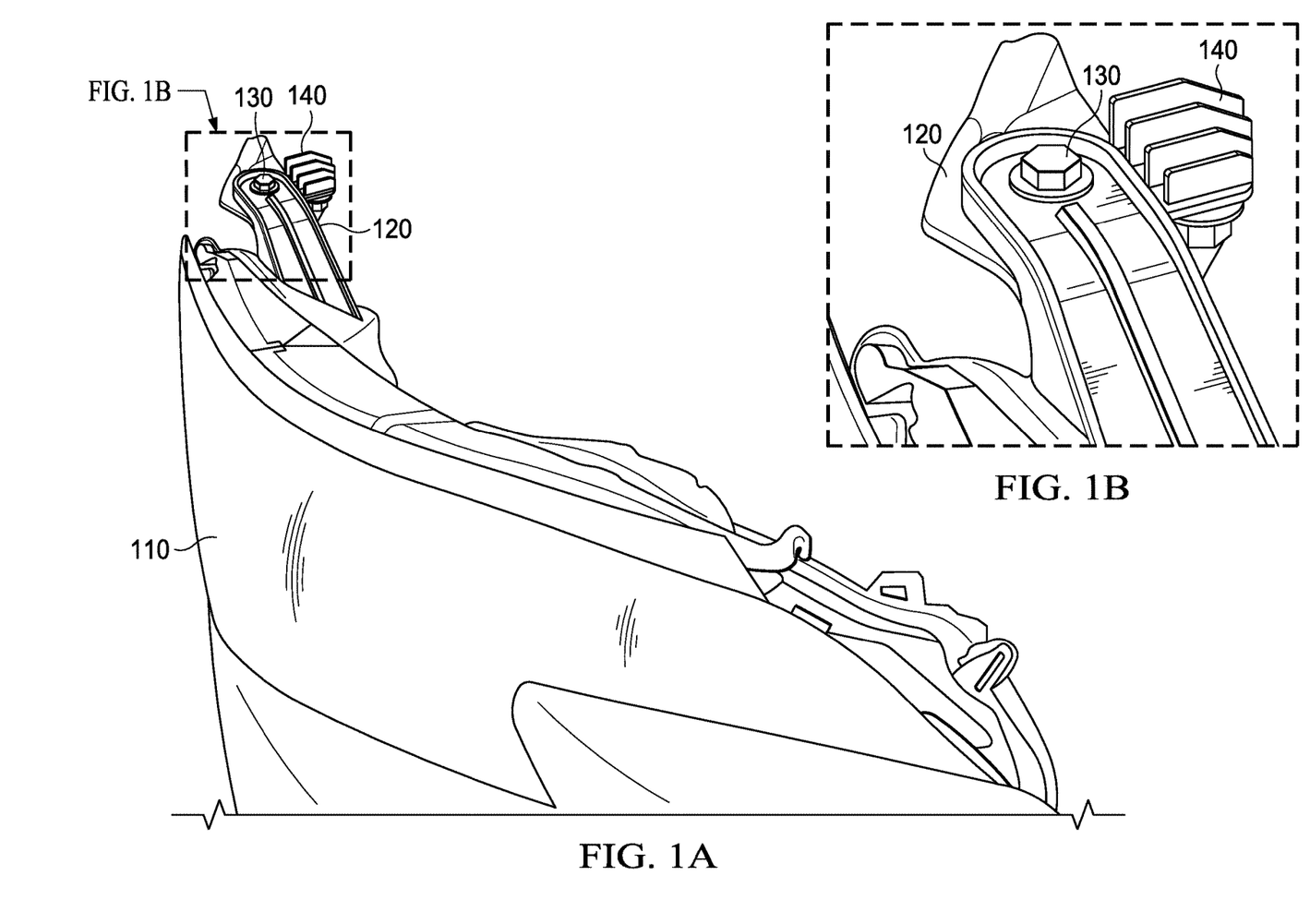
FIG. 1A is a side perspective view of an example vehicle headlight assembly that incorporates a headlight attachment loading block, in accordance with at least one embodiment of the present disclosure.
FIG. 1B is a detail view of FIG. 1A.

FIG. 1A is a side perspective view of an example vehicle headlight assembly 100 that incorporates a headlight attachment loading block 140, in accordance with at least one embodiment of the present disclosure. FIG. 1B is a detail view of FIG. 1A. Visible are the headlight lens 110, headlight-to-front-fender attachment 120, fastener 130, and headlight attachment loading block or load block 140. The headlight-to-front-fender attachment 120 may for example be made of plastic or a lightweight metal such as aluminum. The fastener 130 may for example be a bolt, although other fastener types may be used instead or in addition, including but not limited to screws, pins, rivets, welds, solders, or adhesives. The load block or loading block 140 may for example be made of plastic or a lightweight metal such as aluminum, and may be fixedly attached to the headlight-to-front-fender attachment 120, or may be formed as part of the headlight-to-front-fender attachment 120.

In an example, the size, shape, and position of the load block 140 are selected such that the load block 140 has at least 5 millimeters (mm) of clearance from the hood inner panel during normal operation of the vehicle when the vehicle hood is closed. However, in such an example the size, shape, and position of the load block 140 are also selected such that the load block 140 comes into contact with the hood inner panel within less than 2 milliseconds (ms) of the pedestrian headform contacting the hood outer panel in a GTR9-type pedestrian collision, as described below. A person of ordinary skill in the art of vehicle design will recognize that the load block 140 may be placed in different locations on the headlight assembly 100, and that each location may necessitate particular combinations of size, shape, and orientation in order to achieve the described early loading of the headlight assembly. Furthermore, the skilled person will appreciate that these variations in location, size, shape, and orientation may improve the ability of the load block 140 to absorb, redirect, dissipate, deflect, or distribute energy delivered to the headlight assembly 100 by a deforming vehicle hood in other types of collision events. Such embodiments explicitly fall within the scope of the present disclosure.

Before continuing, it should be noted that the examples described above are provided for purposes of illustration, and are not intended to be limiting. Other devices and/or device configurations may be utilized to carry out the operations described herein.

Figure 2:
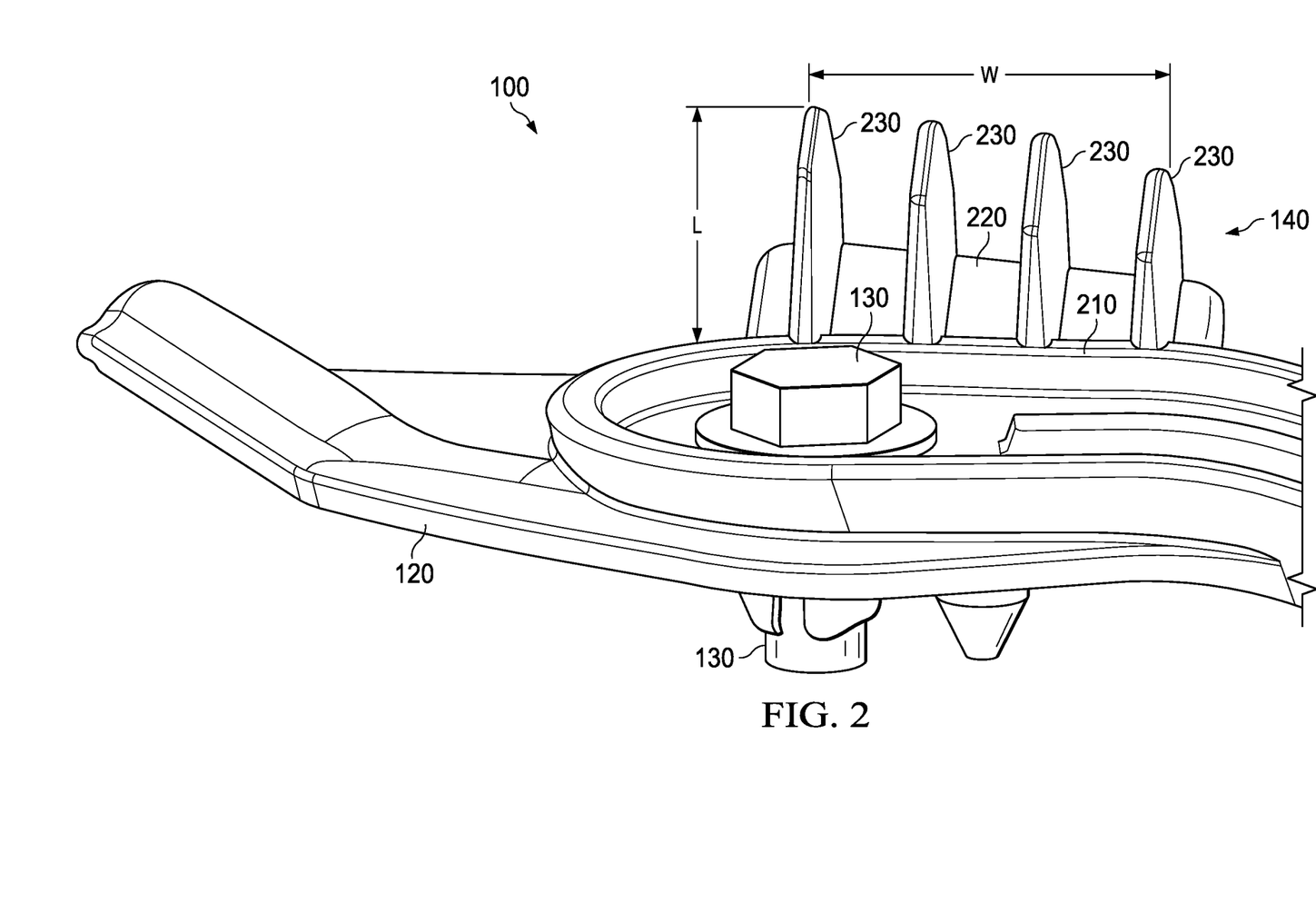
FIG. 2 is a perspective view of an example a headlight attachment loading block, in accordance with at least one embodiment of the present disclosure.

FIG. 2 is a perspective view of an example a headlight attachment loading block or load block 140, in accordance with at least one embodiment of the present disclosure. Also visible are the headlight-to-front-fender attachment 120 and fastener 130. The load block 140 can take many forms while still fulfilling its intended purpose of receiving impact forces early in a GTR9-type passenger collision event. For example, the load block 140 may be a solid block of metal, plastic, rubber, ceramic, fiberglass, or other materials, or may take a variety of different shapes depending on the implementation, including spherical, cylindrical, prismatic, conical, pyramidal, or otherwise. In the example shown in FIG. 2, the load block 140 includes a base 210, a spine 220 oriented away from the base, and a plurality of fins 230 disposed at an angle (e.g., 90 degrees) to the spine. This structure provides a length L that extends the structure of the headlight-to-front-fender attachment 120 toward the hood inner panel of the vehicle, as described below, and a width W that may for example provide a total load capacity that is proportional to the width W. In the example shown in FIG. 2, the load block 140 includes one base 210, one spine 220, and four fins 230, although other numbers and arrangements may be provided instead or in addition. The structure of the load block 140 shown in FIG. 2 is lighter than a solid block of material of the same dimensions, and may provide for easy draining of water or other liquids, this preventing unwanted pooling. The spine 220 and fins 230, or equivalent structural features such as ribs, posts, slats, etc., can provide stiffness to the structure, but may also be frangible, such that they are able to absorb and dissipate some of the force and energy of a headform impact on the hood outer panel. In the example shown in FIG. 2, the load block 140 is disposed adjacent to the fastener 130, near the distal end of the attachment portion 120, although other positions or orientations may be provided instead or in addition.

Figure 3:
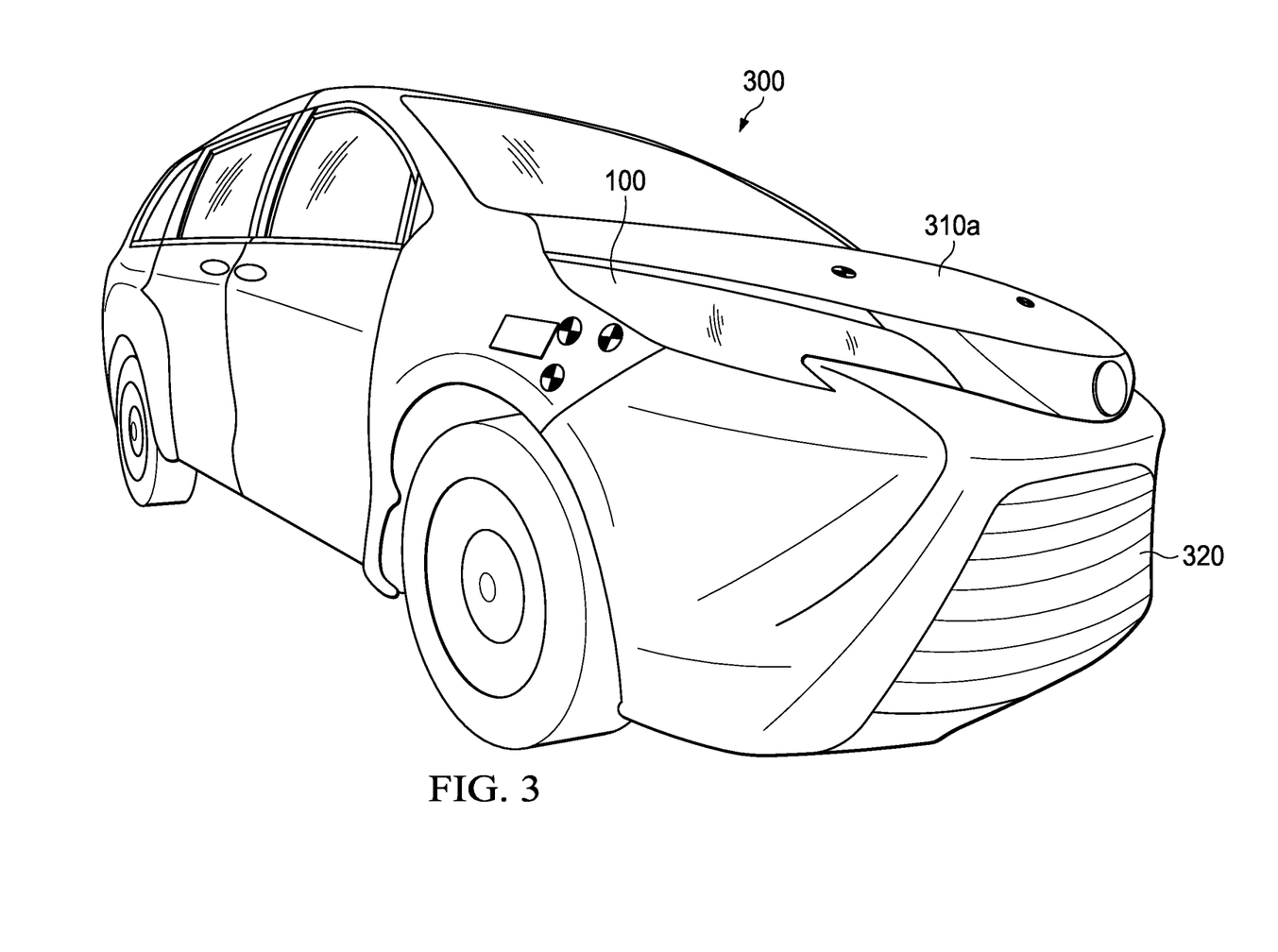
FIG. 3 is a front corner perspective view of an example vehicle, in accordance with at least one embodiment of the present disclosure.

FIG. 3 is a front corner perspective view of an example vehicle 300, in accordance with at least one embodiment of the present disclosure. Visible are a headlight assembly 100 the hood outer panel 310a, and the front grille 320.

Figure 4:
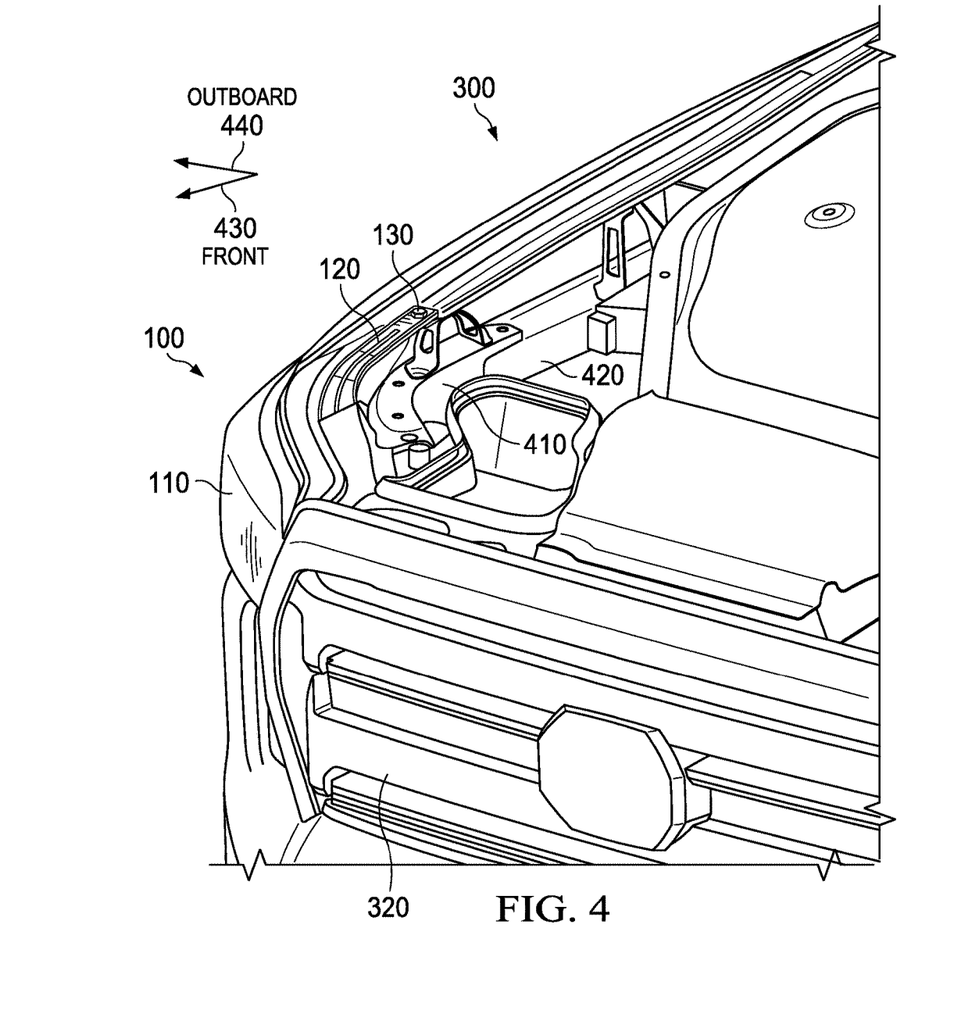
FIG. 4 is a top front corner perspective view of at least a portion of an example vehicle, in accordance with at least one embodiment of the present disclosure.

FIG. 4 is a top front corner perspective view of at least a portion of an example vehicle 300, in accordance with at least one embodiment of the present disclosure. Visible are the headlight assembly 100, including the headlight lens 100, an existing headlight-to-front-fender attachment 120 which does not include a load block 140, and a fastener 130. Also visible are the front grille 320, fender 420 and apron 410, along with a forward or front direction 430 and an outboard or right direction 440.

Figure 5:
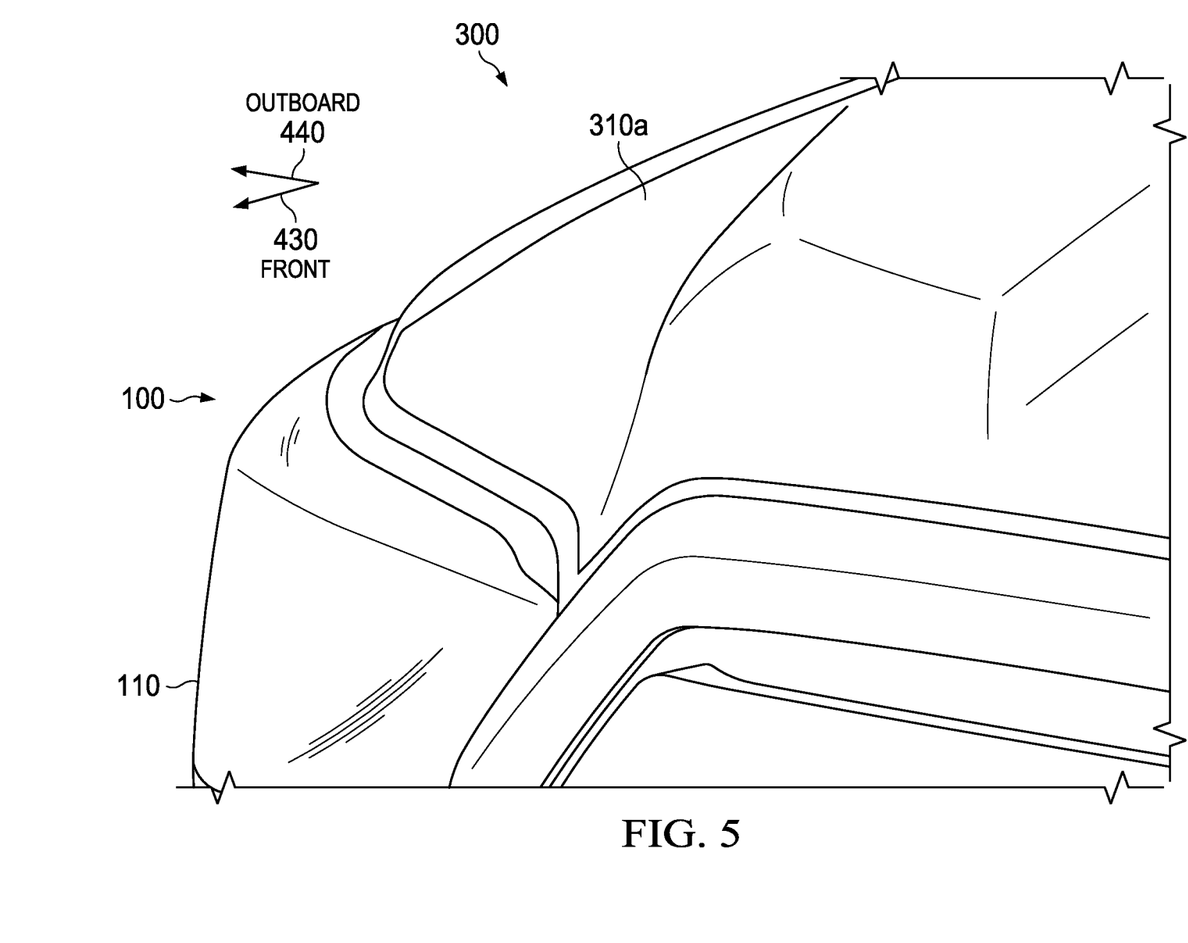
FIG. 5 is a top front corner perspective view of at least a portion of an example vehicle, in accordance with at least one embodiment of the present disclosure.

FIG. 5 is a top front corner perspective view of at least a portion of an example vehicle 300, in accordance with at least one embodiment of the present disclosure. Visible are the headlight assembly 100, including the headlight lens 100. Also visible are the front grille 320 and hood outer panel 310a.

Figure 6:
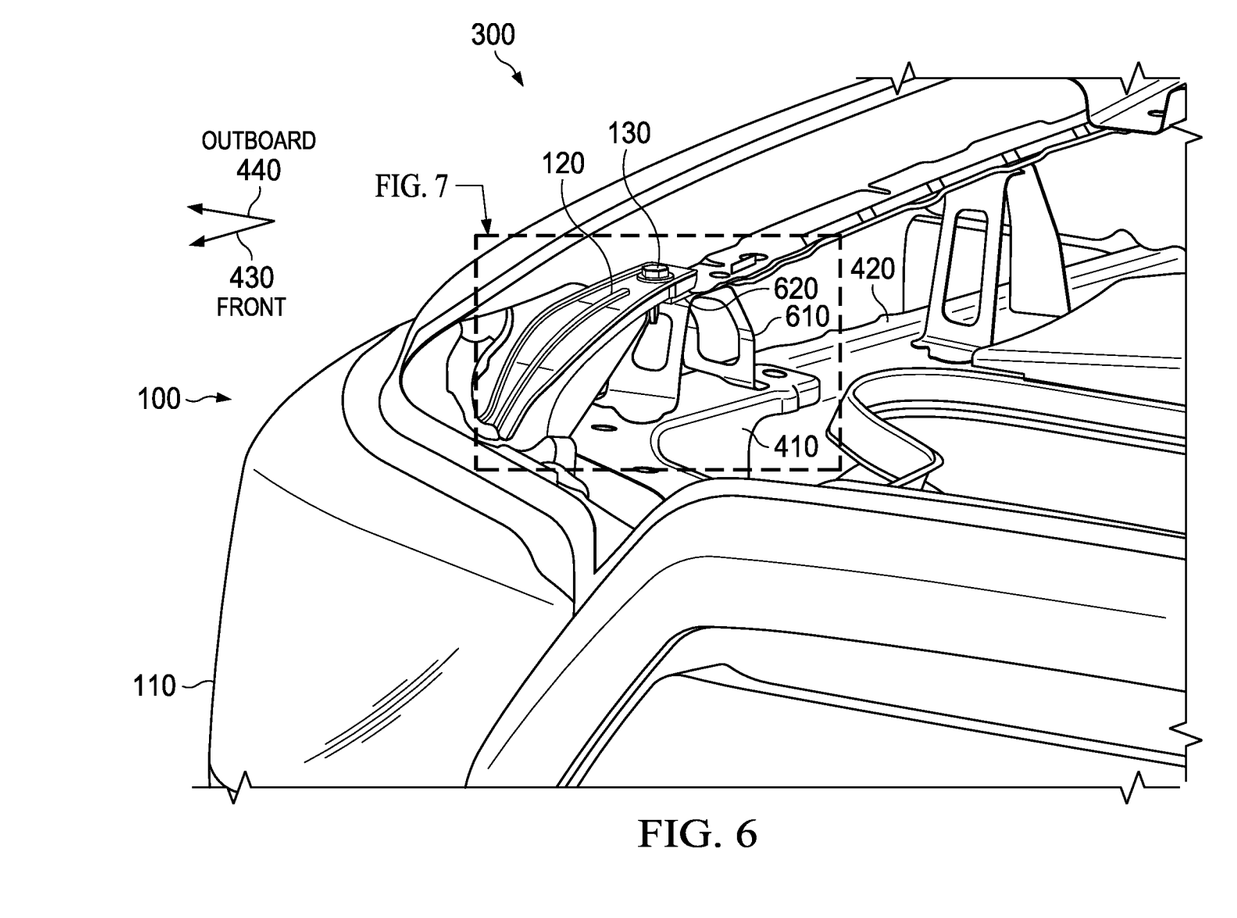
FIG. 6 is a top front corner perspective view of at least a portion of an example vehicle, in accordance with at least one embodiment of the present disclosure.

FIG. 6 is a top front corner perspective view of at least a portion of an example vehicle 300, in accordance with at least one embodiment of the present disclosure. Visible are the headlight assembly 100, including the headlight lens 100, headlight-to-front-fender attachment 120, and fastener 130. Also visible are the fender attachment bracket 610, which attaches to the apron 410 and fender 420, or apron panel 410 and fender panel 420, and includes an upper attachment portion 620.

Figure 7:
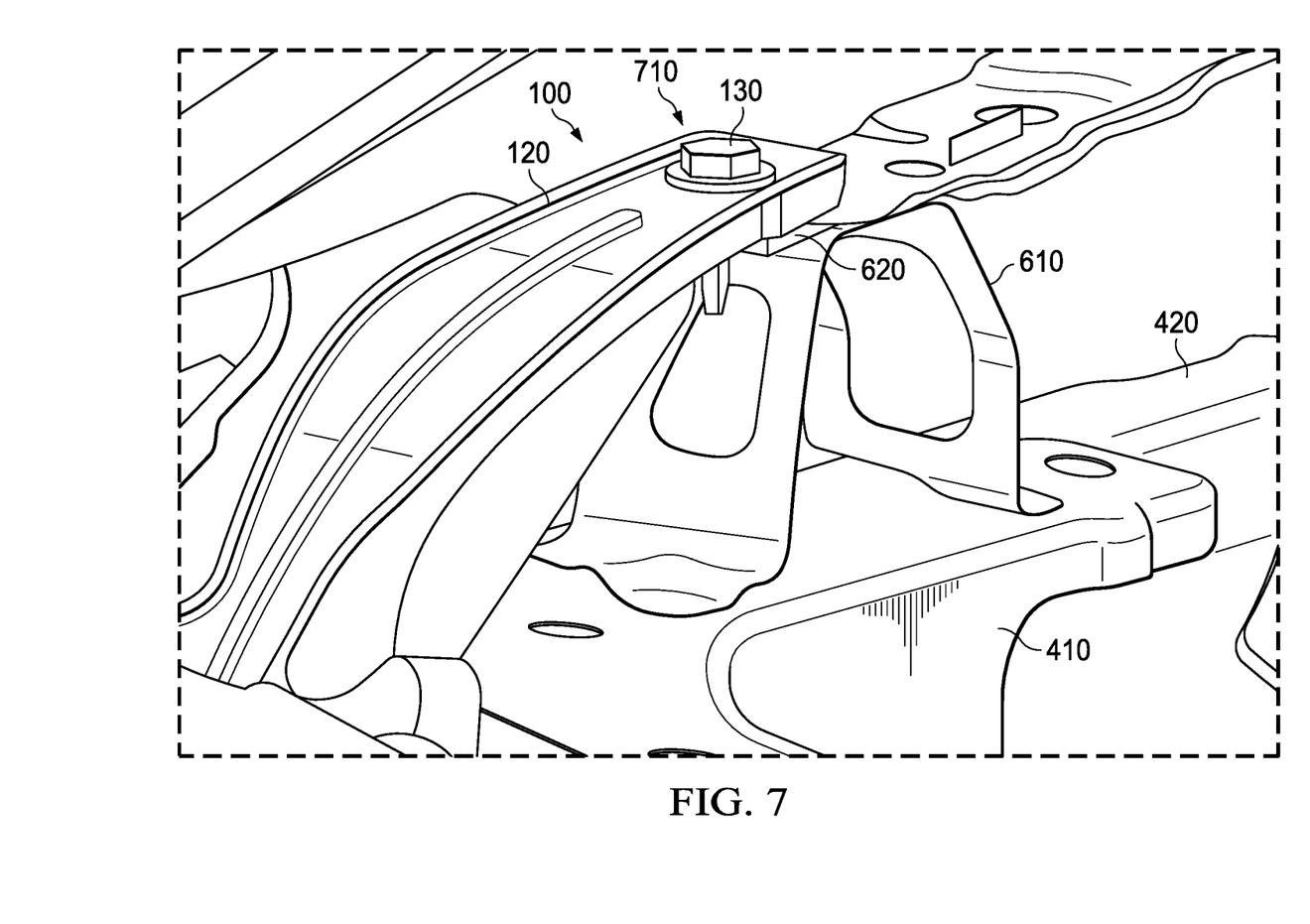
FIG. 7 is a top front corner perspective view of at least a portion of an example vehicle, in accordance with at least one embodiment of the present disclosure.

FIG. 7 is a top front corner perspective view of at least a portion of an example vehicle 300, in accordance with at least one embodiment of the present disclosure. Visible are portions of the headlight assembly 100, including the headlight-to-front-fender attachment 120, and fastener 130. Also visible are the fender attachment bracket 610 and apron 410. The fender attachment bracket 610 includes an upper attachment portion 620, and the headlight-to-front-fender attachment 120 includes an attachment portion 710. The fastener 130 attaches the attachment portions 620 and 710, thus attaching the headlight assembly 100 to the fender attachment bracket 610, which in turn is attached to the apron 410 and fender 420.

During a GTR9-type frontal pedestrian collision, as the pedestrian headform deforms the vehicle hood, one of the possible load paths is from the hood to the headlight-to-front-fender attachment 120. The headlight-to-front-fender attachment 120 can then fracture, deform, and/or compress the fender attachment bracket 410 toward the apron 410, thus absorbing, dissipating, or transferring a portion of the impact energy. With a standard headlight-to-front-fender attachment 120, as shown, this dissipation of energy happens too late in the impact event to affect the amount of trauma to the headform caused by other load paths through different vehicle components. However, the addition of a headlight attachment loading block or load block 140 to the headlight-to-front-fender attachment 120 (as shown for example in FIGS. 1 and 2) can cause loading of the headlight-to-front fender attachment 120 to occur earlier in the collision event, thus enabling the headlight-to-front fender attachment 120 and fender attachment bracket 610 to begin absorbing energy at an earlier time, which may reduce the total acceleration experienced by the pedestrian headform, reducing Head Injury Criterion (HIC) and thus reducing the chances of traumatic injury to the pedestrian.

Figure 8:
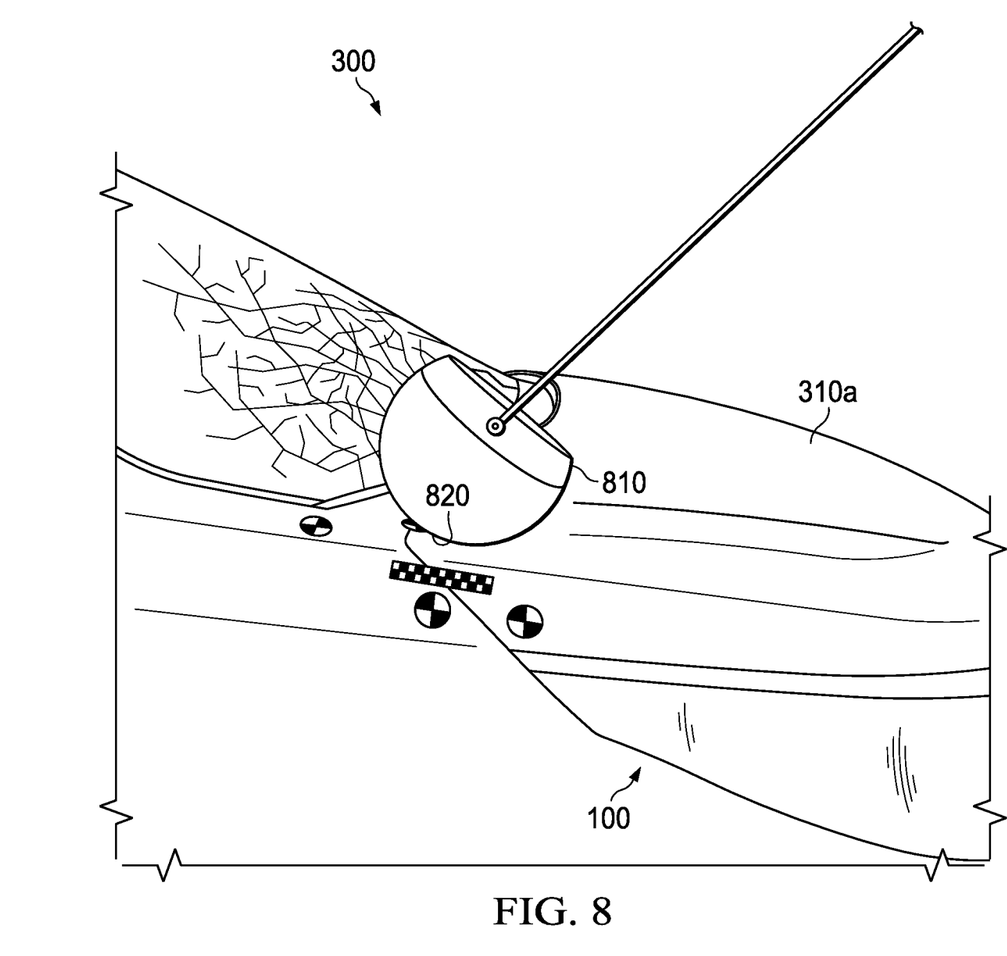
FIG. 8 is a side view of a pedestrian headform striking the outer hood panel of an example vehicle, in accordance with at least one embodiment of the present disclosure.

FIG. 8 is a side view of a pedestrian headform 810 striking the outer hood panel 310a of an example vehicle 300, in accordance with at least one embodiment of the present disclosure. Visible is the headlight assembly 100. When the headform 810 strikes an impact point 820 on the hood outer panel 310a, the hood outer panel 310a deforms, along with the hood inner panel (shown below in FIGS. 9 and 10), and directs forces through other vehicle components along multiple load paths. At least one such load path is through the headlight-to-front fender attachment 120 (shown above in FIGS. 1-2 and 4-7), which may be below and proximate to the impact point 820. However, with a standard headlight-to-front fender attachment 120, such loading may occur late in the collision event, whereas with the addition of a headlight attachment loading block 140 (as shown above in FIGS. 1-2), the hood inner panel may strike the headlight attachment loading block 140 at an earlier time, and thus load the headlight-to-front fender attachment 120 early enough to affect the total acceleration experienced by the headform 810 during the collision event.

In a GTR9-compliant pedestrian collision test, the headform 810 weighs 3.5 kilograms, and the vehicle is moving at 35 kilometers per hour relative to the headform.

Figure 9:
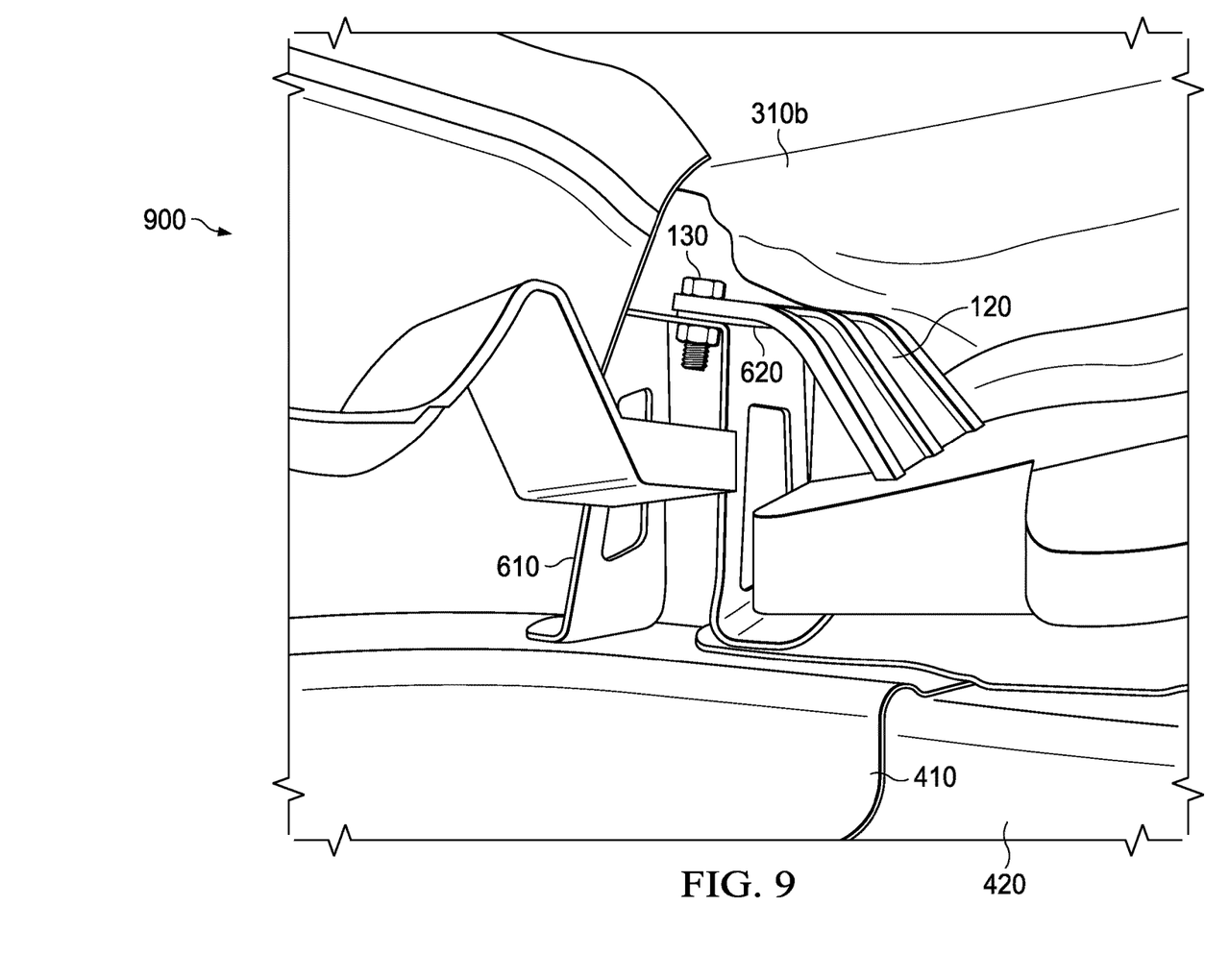
FIG. 9 is a perspective view from inside the engine compartment of an example vehicle, in accordance with at least one embodiment of the present disclosure.

FIG. 9 is a perspective view from inside the engine compartment 900 of an example vehicle, in accordance with at least one embodiment of the present disclosure. Visible are the hood inner panel 310b, standard headlight-to-front fender attachment 120, fastener 130, fender attachment bracket 610, apron 410, and fender 420. In a GTR9 pedestrian collision scenario, the pedestrian headform can compress the outer hood panel 810a (as shown for example in FIG. 8, above) and the inner hood panel 310b, such that the inner hood panel 310b contacts multiple components within the engine compartment 900, thus distributing the force across multiple load paths. At least one such load path is through the headlight-to-front fender attachment 120, fender attachment bracket 610, and apron 410. However, with a standard headlight-to-front fender attachment 120 as shown in FIG. 9, such loading may occur too late in the collision event to have a significant effect on the accelerations experienced by the pedestrian headform.

Figure 10:
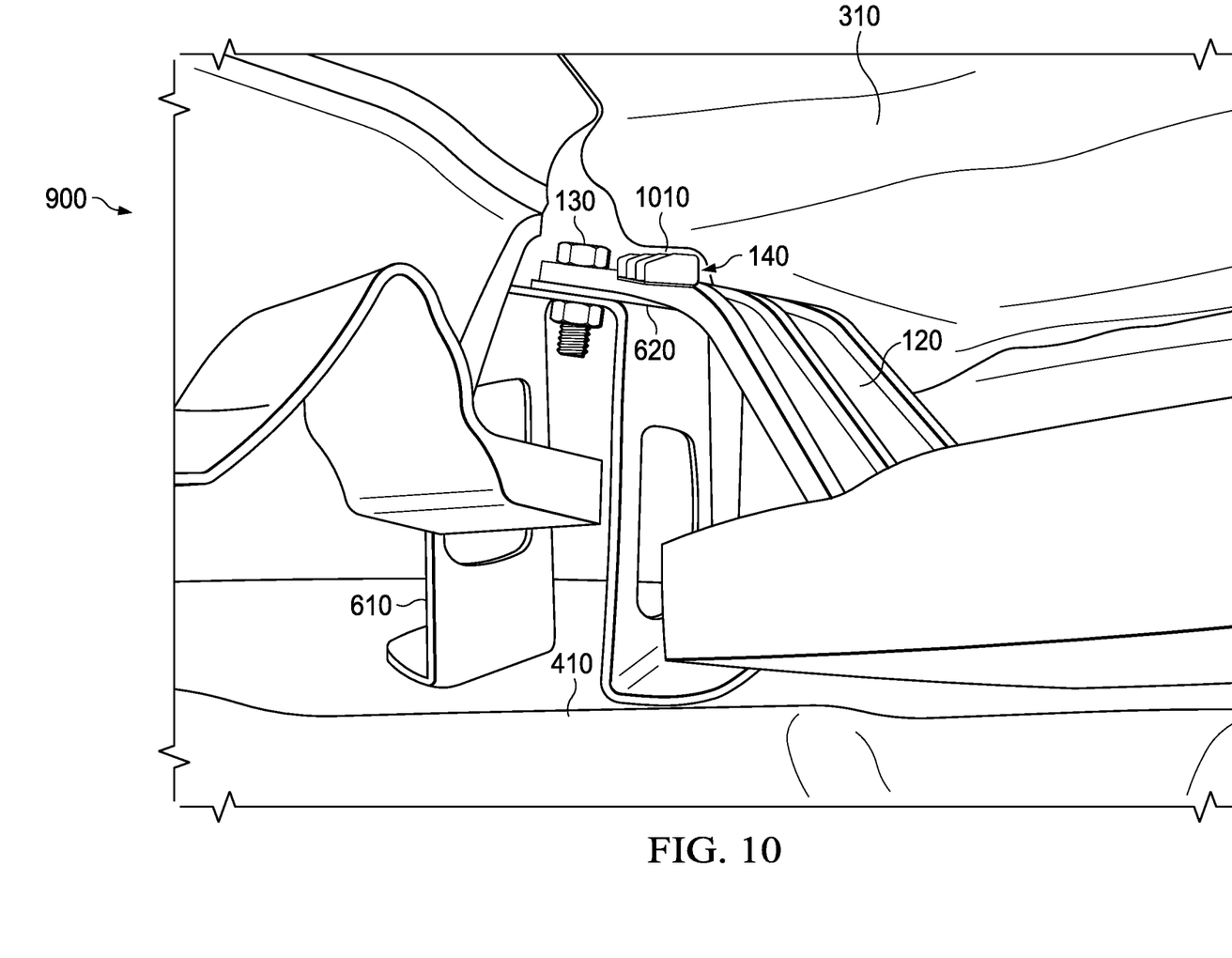
FIG. 10 is a perspective view from inside the engine compartment of an example vehicle, in accordance with at least one embodiment of the present disclosure.

FIG. 10 is a perspective view from inside the engine compartment 900 of an example vehicle, in accordance with at least one embodiment of the present disclosure. Visible are the hood inner panel 310b, fastener 130, fender attachment bracket 610, apron 410, and fender 420, along with a modified headlight-to-front fender attachment 120 that includes a headlight attachment loading block 140. In an example, the headlight-to-front fender attachment 120 and headlight attachment loading block 140 are configured such that there is a clearance gap 1010 (e.g., a 2-10 mm gap, and preferably a 5 mm gap) between the hood inner panel 310b and the headlight attachment loading block 140.

In a GTR9 pedestrian collision scenario, the pedestrian headform can compress the inner hood panel 310b such that it contacts the headlight attachment loading block 140 earlier than it contacts other components within the engine compartment 900, thus causing early forces of the headform impact to be distributed through the headlight-to-front fender attachment 120, fender attachment bracket 610, and apron 410. In this case, compression of the fender attachment bracket 610 into the apron 410, coupled with deformation or fracture of the headlight-to-front fender attachment 120 and headlight attachment loading block 140, can contribute some energy absorption early enough in the collision event to reduce the total acceleration experienced by the pedestrian headform.

The load block 140 may be a solid block of a flexible material such as butyl rubber or a plastic material such as polypropylene, although other materials may be used instead or in addition, including but not limited to metals, ceramics, and composites. The load block 140 may also have a lighter, more complex shape, such as the base, spine, and fin configuration shown in FIG. 2, or any equivalent shape that is capable of extending a portion of the headlight assembly closer to the hood inner panel. The load block 140 may for example be disposed near the distal end of the attachment portion 120, as this location may be the closest point on the headlight assembly to the hood inner panel 310. The load block 140 may be oriented in a generally upward direction so that at least some portions of the load block 140 are located within a specified clearance gap (e.g., 5 mm) of the hood inner panel when the hood is closed. However, other locations or orientations of the load block 140 may also place portions of the load block 140 within the specified clearance gap of the hood inner panel, thus serving the purpose of transferring impact energy from the hood to the headlight assembly and the fender attachment bracket 610.

Figure 11:
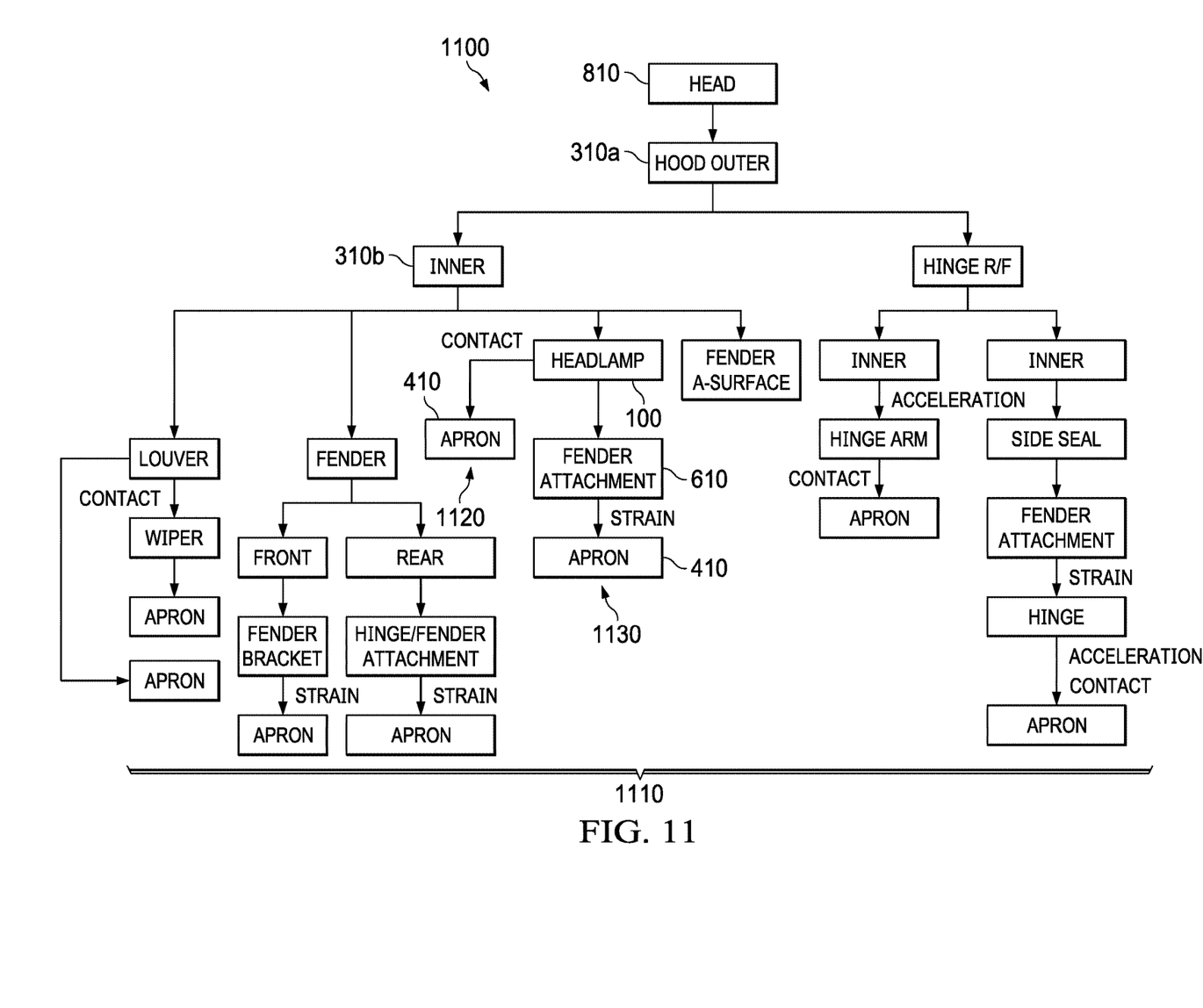
FIG. 11 is a load path diagram of an example vehicle during a GTR9-type pedestrian collision event, in accordance with at least one embodiment of the present disclosure.

FIG. 11 is a load path diagram 1100 of an example vehicle during a GTR9-type pedestrian collision event, in accordance with at least one embodiment of the present disclosure. The load path diagram 1100 includes a plurality of load paths 1110 indicating the order in which force is transferred to different components within the vehicle. Two load paths, 1120 and 1130, pass through the headlamp or headlight assembly 100. In load path 1120, the pedestrian headform 810 strikes the hood outer panel 310a, which transfers force through the hood inner panel 310b to the headlamp or headlight assembly 100, which contacts the apron 410. In load path 1130, the pedestrian headform 810 strikes the hood outer panel 310a, which transfers force through the hood inner panel 310b to the headlamp or headlight assembly 100, which deforms the fender attachment bracket 610 and thus transfers force to the apron 410.

In a vehicle with a standard a headlight-to-front fender attachment 120, load paths 1120 and 1130 occur too late in the collision event to beneficially affect the total acceleration experienced by the pedestrian headform. However, in a vehicle with a headlight-to-front fender attachment 120 that includes a headlight attachment loading block 140, the hood inner panel 310b is physically closer to the highest point on the headlamp or headlight assembly 100, such that load paths 1120 and 1130 may occur earlier in the collision event. In this case, the frangibility of the headlight assembly 100 and the compressibility of the fender attachment bracket 610 can provide early energy absorption that reduces the total acceleration experienced by the pedestrian headform.

Figure 12:
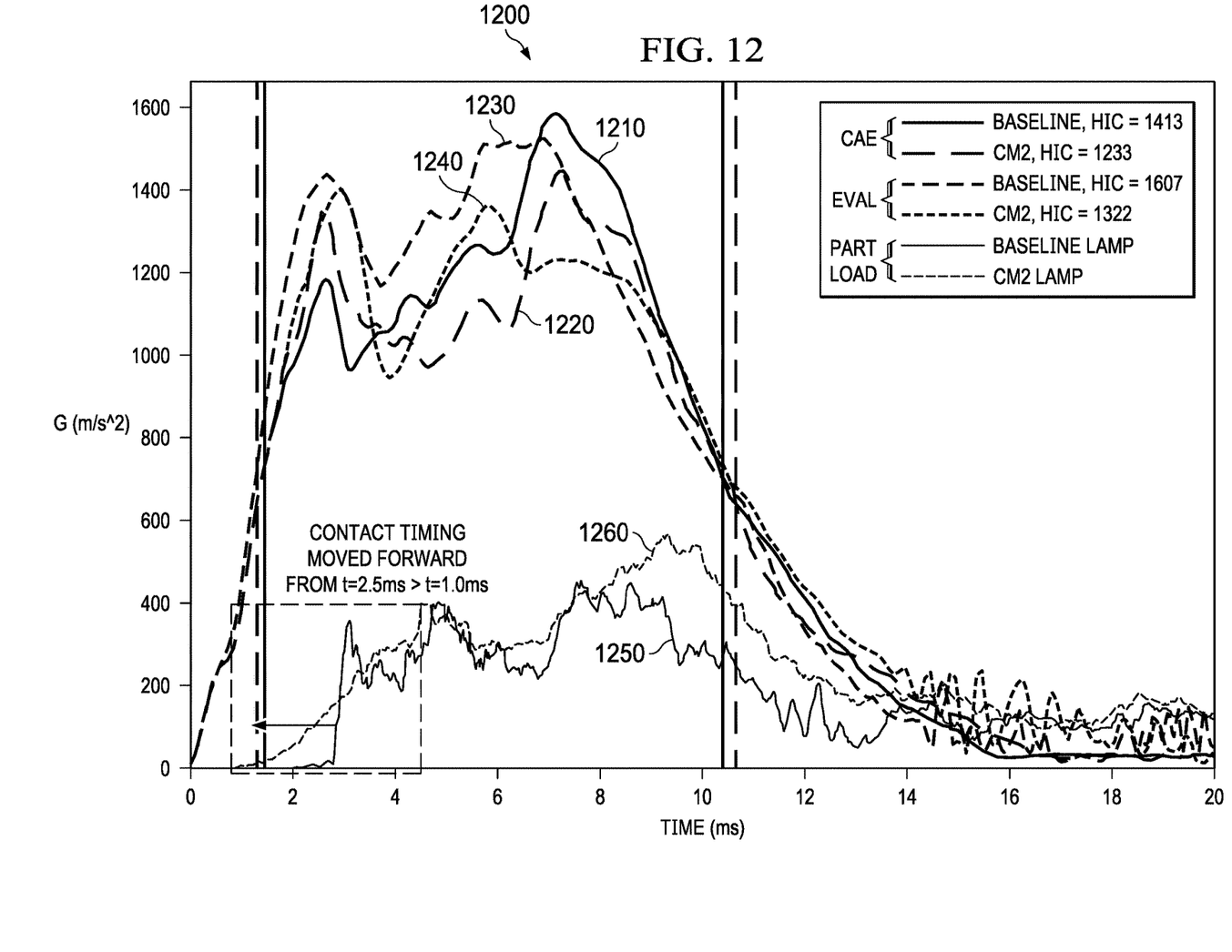
FIG. 12 is a graph showing the acceleration experienced by a pedestrian headform during a GTR9-type pedestrian collision event under various scenarios, in accordance with at least one embodiment of the present disclosure.

FIG. 12 is a graph 1200 showing the acceleration experienced by a pedestrian headform during a GTR9-type pedestrian collision event under various scenarios, in accordance with at least one embodiment of the present disclosure. Curve 1210 shows a computer aided evaluation (CAE) simulation of a headform colliding with a baseline vehicle (e.g., a vehicle without the headlight attachment loading block 140). Curve 1220 shows a CAE simulation of a headform colliding with a countermeasure vehicle (e.g., a vehicle that includes the headlight attachment loading block 140). Curve 1230 shows a physical crash test evaluation of a headform colliding with a baseline vehicle. Curve 1240 shows a physical crash test evaluation of a headform colliding with a countermeasure vehicle.

As can be seen in the graph 1200, curve 1220 shows higher early accelerations than curve 1210, indicating that early loading of the load paths involving the headlight assembly. However, the total area under curve 1220 is less than the total area under curve 1210, indicating that the early loading of the headlight assembly has reduced the total acceleration experienced by the headform. A parameter called "head injury criterion" (HIC) is related to the total area under the acceleration curve, and describes the probability or severity of traumatic injury to the headform. In an example, HIC of 1000 may be associated with an 18% risk of severe injury or death, a 55% risk of serious injury, and a 90% risk of moderate injury. The baseline case shows a HIC of 1413, whereas the countermeasure case shows a HIC of 1233—a 13% improvement. Peak acceleration is also reduced, from 1600 meters per second squared ($m/s^2$) to about 1450 $m/s^2$—approximately a 10% improvement.

In the crash test curves 1230 and 1240, early loading differences between the baseline curve 1230 and countermeasure curve 1240 are less significant, possibly because the real-world fracturing of plastic or ceramic components and the tearing or crumpling of metallic components introduce uncertainty into the exact timing and loading of each possible load path. Nevertheless, the total area under the countermeasure curve 1240 is less than the total area under the baseline curve 1230, resulting in an 18% reduction in HIC, from 1607 to 1322. Peak acceleration is also reduced, from about 1500 $m/s^2$ to about 1350 $m/s^2$—approximately a 10% improvement.

Curve 1250 shows loading on the lamp or headlight assembly of the baseline vehicle, whereas curve 1260 shows loading on the lamp or headlight assembly of the countermeasure vehicle. In the baseline case, the first contact forces are not exerted on the headlight assembly until 2.5 milliseconds into the impact event, whereas in the countermeasure case, the first contact forces are exerted on the headlight assembly at approximately 1.0 milliseconds. The headlight assembly continues to experience higher loading throughout most of the collision event, such that the total area under the countermeasure curve 1260 is higher than the total energy under the baseline curve 1250, indicating that the load paths that include the headlight assembly are absorbing a larger fraction of the total impact load. This may be beneficial because the vehicle components associated with these load paths are more readily frangible and/or compressible, thus providing a greater stroke or "cushion" for the headform impact, allowing energy to be absorbed over a longer time and distance.

The novel features of the present disclosure have allowed for a 13-18% reduction in head injury criterion (HIC) during a GTR9-type pedestrian collision event, where the front of a vehicle moving 35 KPH strikes a short-stature pedestrian (e.g., a child). By controlling the timing of load paths involving the headlight assembly, the headlight attachment loading block has improved the ability of the headlight assembly to absorb, redirect, and dissipate energy from the collision, thus reducing the accelerations experienced by the pedestrian headform.

Accordingly, it can be seen that the headlight attachment loading block offers substantial improvement, by improving pedestrian safety in the challenging GTR9 collision scenario. The headlight attachment loading block permits advantageous improvement of vehicle load paths during a pedestrian collision event, thus improving load distribution and energy dissipation, and reducing head trauma to the pedestrian, with minimal change in the cost, weight, or complexity of the vehicle, or of the headlight assembly in particular.

Depending on the implementation, the headlight attachment loading block may be made from a variety of different materials, including but not limited to metals, composites, ceramics, and polymers. Headlight attachment loading block members may be hollow or solid so as to provide a high degree of control over the loading, deformation, and fracture properties of the headlight assembly, with low added weight. Some components may be annealed, sintered, case-hardened, cast, or injection molded to tune their fracture properties. Attachment may be with bolts, screws, rivets, rods, pins, clips, brackets, adhesives, welds, or otherwise, and may be to various portions of the headlight assembly. Protection afforded by the headlight attachment loading block may apply not only to pedestrian headforms, but also other objects striking the hood outer panel, including animals, sign posts, light poles, sports equipment, etc. Furthermore, a number of variations are possible on the examples and embodiments described above. For example, the components could be longer, shorter, wider, thicker or of different shape than depicted herein, and may be oriented or angled in alternative manners that serve the same purpose of limiting pedestrian head trauma during a collision event. The technology described herein may be employed in automobiles and trucks of diverse type and design, regardless of their underlying propulsion technologies.

Accordingly, the logical operations making up the embodiments of the technology described herein are referred to variously as operations, steps, objects, elements, components, or modules. It should be understood that these may occur or be arranged in any order, unless explicitly claimed otherwise or a specific order is inherently necessitated by the claim language.

In some implementations, the components are threaded together. In other embodiments, multiple parts are welded together or co-formed as single parts. It should further be understood that the described technology may be employed in diverse vehicle types, whether motorized or not, including but not limited to vans, minivans, SUVs, crossover vehicles, RVs, trailers, mobile homes, food trucks, and first responder vehicles.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the headlight attachment loading block. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the headlight attachment loading block as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle, comprising:
   a hood outer panel;
   a hood inner panel;
   a fender attachment bracket disposed within an engine compartment of the vehicle; and
   a headlight assembly comprising:
      an attachment portion coupling the headlight assembly to the fender attachment bracket,
      wherein the attachment portion is coupled only to the headlight assembly and the fender attachment bracket,
      wherein the fender attachment bracket is coupled only to the attachment portion and the fender, and
      wherein the headlight assembly is coupled to the fender attachment bracket by the attachment portion; and
   a load block coupled only to the attachment portion and configured such that when an impact of an object deforms the hood outer panel and hood inner panel, the hood inner panel contacts the load block.

2. The vehicle of claim 1, wherein the load block comprises a polymer.

3. The vehicle of claim 1, wherein the load block comprises at least one of a stiffening spine or a plurality of fins.

4. The vehicle of claim 1, wherein a clearance gap between the load block and the hood inner panel comprises a distance of 2-10 millimeters.

5. The vehicle of claim 1, wherein the load block is configured to minimize pooling of liquids.

6. The vehicle of claim 1, wherein the load block is configured to alter a timing or magnitude of a load force along load paths of the vehicle associated with the impact.

7. The vehicle of claim 6, wherein the load block is configured to shorten a time between the impact and a loading of at least one load path comprising the headlight assembly.

8. The vehicle of claim 7, wherein at least one load path of the at least one load path comprising the headlight assembly also comprises the fender attachment bracket.

9. The vehicle of claim 1, wherein the load block is configured to reduce at least one of a peak acceleration, a total acceleration, or a head impact criterion (HIC) experienced by the object as a result of the impact.

10. A method comprising:
    on a headlight assembly of a vehicle, providing:
       an attachment portion coupling the headlight assembly to a fender attachment bracket of the vehicle,
       wherein the attachment portion is coupled only to the headlight assembly and the fender attachment bracket,
       wherein the fender attachment bracket is coupled only to the attachment portion and the fender, and
       wherein the headlight assembly is coupled to the fender attachment bracket by the attachment portion; and
    a load block coupled only to the attachment portion and configured such that when an impact of an object deforms a hood outer panel and hood inner panel of the vehicle, the hood inner panel contacts the load block.

11. The method of claim 10, wherein the load block comprises a polymer and at least one of a stiffening spine or a plurality of fins.

12. The method of claim 10, wherein the load block is configured to alter a timing or magnitude of a load force along load paths of the vehicle associated with the impact.

13. The method of claim 12, wherein the load block is configured to shorten a time between the impact and a loading of at least one load path comprising the headlight assembly.

14. The method of claim 13, wherein at least one load path of the at least one load path comprising the headlight assembly also comprises the fender attachment bracket.

15. The method of claim 13, wherein the load block is configured to reduce at least one of a peak acceleration, a total acceleration, or a head impact criterion (HIC) experienced by the object as a result of the impact.

16. A system for distributing crash energy within a vehicle, comprising:
    the vehicle;
    a hood outer panel of the vehicle;
    a hood inner panel of the vehicle;
    a fender attachment bracket disposed within an engine compartment of the vehicle; and
    a headlight assembly of the vehicle comprising:
       an attachment portion coupling the headlight assembly to the fender attachment bracket,
       wherein the attachment portion is coupled only to the headlight assembly and the fender attachment bracket,
       wherein the fender attachment bracket is coupled only to the attachment portion and the fender, and
       wherein the headlight assembly is coupled to the fender attachment bracket by the attachment portion; and
    a load block coupled only to the attachment portion and configured such that when an impact of a pedestrian headform deforms the hood outer panel and hood inner panel, the hood inner panel contacts the load block to shorten a time between the impact and a loading of at least one load path comprising the headlight assembly and the fender attachment bracket, and
    wherein the load block is configured to reduce at least one of a peak acceleration, a total acceleration, or a head impact criterion (HIC) experienced by the headform as a result of the impact.

* * * * *